(12) United States Patent
Li et al.

(10) Patent No.: US 12,556,977 B2
(45) Date of Patent: Feb. 17, 2026

(54) METHOD FOR LEARNING QoS PERFORMANCE INTER- DEPENDENCE OF COMMUNICATION LINK

(71) Applicant: MITSUBISHI ELECTRIC CORPORATION, Tokyo (JP)

(72) Inventors: Qianrui Li, Rennes (FR); Herve Bonneville, Rennes (FR); Nicolas Gresset, Rennes (FR); Akl Charaf, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 195 days.

(21) Appl. No.: 18/278,783

(22) PCT Filed: Sep. 15, 2021

(86) PCT No.: PCT/JP2021/034922
§ 371 (c)(1),
(2) Date: Aug. 24, 2023

(87) PCT Pub. No.: WO2022/208936
PCT Pub. Date: Oct. 6, 2022

(65) Prior Publication Data
US 2024/0137815 A1    Apr. 25, 2024
US 2024/0236772 A9    Jul. 11, 2024

(30) Foreign Application Priority Data

Mar. 31, 2021  (EP) ..................................... 21305412

(51) Int. Cl.
*H04W 28/24*  (2009.01)
*H04L 45/12*  (2022.01)
(Continued)

(52) U.S. Cl.
CPC ........... *H04W 28/24* (2013.01); *H04L 45/123* (2013.01); *H04W 28/0268* (2013.01); *H04W 28/06* (2013.01)

(58) Field of Classification Search
CPC .. H04W 28/24; H04W 28/0268; H04L 45/123
See application file for complete search history.

(56) References Cited

U.S. PATENT DOCUMENTS

2004/0246962 A1*  12/2004  Kopeikin .............. H04L 47/824
                                                            370/392
2005/0083848 A1    4/2005  Shao et al.
(Continued)

OTHER PUBLICATIONS

International Search Report for PCT/JP2021/034922 mailed on Jan. 26, 2022.
(Continued)

*Primary Examiner* — Todd L Barker
(74) *Attorney, Agent, or Firm* — Birch, Stewart, Kolasch & Birch, LLP

(57) ABSTRACT

A method for learning QoS performance inter-dependence of a plurality of communication links in a network managed by a central node, wherein the plurality of wireless links interface with a common application applying a joint figure of merit, comprising:
- selecting at least two links among the plurality of communication links;
- generating training requests respectively for each selected link;
- measuring QoS performance on each selected link for the training requests; and
- combining the measured QoS performance of the selected links, so as to obtain the QoS performance inter-dependence between the selected links.

10 Claims, 5 Drawing Sheets

(51) Int. Cl.
*H04W 28/02* (2009.01)
*H04W 28/06* (2009.01)

(56) References Cited

U.S. PATENT DOCUMENTS

| | | | |
|---|---|---|---|
| 2005/0157660 A1* | 7/2005 | Mandato | H04L 69/24 |
| | | | 370/254 |
| 2005/0254428 A1 | 11/2005 | Perkins et al. | |
| 2008/0101227 A1 | 5/2008 | Fujita et al. | |
| 2016/0218963 A1* | 7/2016 | Nauck | H04L 45/123 |
| 2017/0155532 A1* | 6/2017 | Alexander | H04L 27/2338 |
| 2019/0059008 A1* | 2/2019 | Liu | H04W 24/04 |
| 2023/0388848 A1* | 11/2023 | Lyazidi | H04W 92/20 |

OTHER PUBLICATIONS

Written Opinion of the International Searching Authority for PCT/JP2021/034922 mailed on Jan. 26, 2022.

* cited by examiner

METHOD FOR LEARNING QoS PERFORMANCE INTER-DEPENDENCE OF COMMUNICATION LINK

TECHNICAL FIELD

The present invention relates to quality of service (QoS) management of network services, especially to a method for learning QoS performance inter-dependence of different links which interface with a common application applying a joint figure of merit as well as a method for optimizing application performance with QoS performance inter-dependency.

BACKGROUND ART

Modern wireless networks, such as 5G, are widely used for its capacity of creating ecosystem for technical and business innovation involving vertical markets. For instance, when using 5G to empower verticals, professional applications have specific requirements in terms of Quality of Service (QoS). Taking a 5G-based railway communication network for example, when railway applications are carried over 5G public broadband networks, similar levels of safety, resilience and reliability must be guaranteed as in the railway dedicated communication networks.

For instance, in 5G, the concept of QoS is based on flows. QoS Flow is the finest granularity of QoS differentiation in a PDU session (a logical connection between a UE and a data network). Each QoS flow is uniquely identified by a QoS Flow ID (QFI), along with the following parameters: 5G QoS Identifier (5QI), which comprises the resource type (Guaranteed Bit Rate (GBR), non-GBR, delay critical GBR), priority level, the packet delay budget (PDB) and the packet error rate (PER), the Allocation Retention Priority (ARP) and optionally the Guaranteed and Max Flow Bitrate. The network treats packets based on their 5QI tags.

A user (UE) may establish several PDU sessions with different data networks; however a given PDU session consists in a single IP tunnel (N3 GTP-U tunnel) between a user plane function named UPF (User Plane Function) and the gNB for the core network trunk, and one or several Data Radio Bearers (DRBs) between the gNB and the UE. It is known, in 5G, QoS Flow mapping happens two times in downlink direction. The first QoS Flow mapping, made by the UPF, is to map QoS flows from the peer entity(ies) to N3 GTP-U tunnel and to tag the flows with a 5QI. Each QoS flow on N3 is mapped to a single GTP-U tunnel. The second QoS mapping is made by the gNB to map QoS flows to DRBs. In 5G, there is a one-to-many relationship between the GTP-U tunnel on N3 and the DRBs on the air interface. The gNB may map individual QoS flows to one more DRBs in the (R)AN ((Radio) Access Network). Hence, a DRB may transport one or more QoS flows. The core network manages QoS flows from the peer entities independently and the access network also manages radio bearers in an independent manner.

In a conventional wireless communication system, a central node (e.g. a BS) manages the different UEs' link performance from radio point of view, and has no view on the application level. Hence, the communication system generally assumes that the UEs' applications are independent. This is generally true for cellular users and applications in the eMBB services. Indeed, in a conventional case, the communication system is not aware that the UEs could be dependent from the application point of view. Also, an application has usually no clue to understand that the link performance from different UEs may be inter-dependent, while in practice in a radio access network, radio resources are shared, i.e. one user performance depends on other users. As shown in FIG. 1, users UE1 and UE2 respectively use independent applications, APP1 and APP2, and the center node, 5G gNB, manages the different UEs' link independently without considering the relationship or dependency between the applications.

However, for certain wireless networks, such as in 5G enabled verticals, professional applications could be carried over 5G public MNO networks. A common application layer dedicated to the professional application is usually deployed. Performances of different wireless links shall be aggregated to jointly fulfil some requirements defined in the professional application. In this case, the inventors have found that the QoS management between different links are inter-dependent and knowing such inter-dependence between different links can be beneficial. This allows the system to provide better QoS management for the professional application due to the fact that the competitive aspect between users can be converted to a cooperative one and some further optimizations of a predefined figure of merit for the professional application can be performed. Such a situation is shown in FIG. 2, wherein UE1 and UE2 use a common application, APP, and the center node, 5G gNB, manages the different UEs' links considering the relationship or dependency between links based on the same application.

The invention aims to use such a finding and improve QoS management in the conventional manner where, in the art, the dependency between the applications has not been yet taken into account.

SUMMARY OF INVENTION

In this regard, according to one aspect of the invention, it is provided a method for learning QoS performance inter-dependence of a plurality of communication links in a network managed by a central node, wherein the plurality of wireless links interface with a common application applying a joint figure of merit, comprising:
  selecting at least two links among the plurality of communication links;
  generating training requests respectively for each selected link;
  measuring QoS performance on each selected link for the training requests; and
  combining the measured QoS performance of the selected links, so as to obtain the QoS performance inter-dependence between the selected links. Wherein the term "combining" especially means interrelating or coordinating the measured QoS performance of the selected links, so as to find the (mathematical) relationship therebetween.

In the context of the present invention, communication links includes both wireless link, such as 5G, and wired link, such as fiber, copper line etc.

Alternatively, the obtained QoS performance inter-dependence contains a set of continuous or discrete QoS profile.

By means of such a method, it is possible to learn and obtain QoS performance inter-dependence of different wireless links where these links interface with a common application applying a joint figure of merit.

In an embodiment, the step of generating training requests respectively for each selected link includes triggering traffic generation on selected links. In addition, the step of measuring QoS performance on each selected link for the training requests includes measuring enhancement or degradation on the selected link.

In particular, the traffic is generated by using a set of different QoS parameters, such as priority level, PDB, PER and/or throughput.

Alternatively, the traffic is a real traffic pertaining to said common application or a dummy traffic generated according to the traffic characteristics of said common application.

In another embodiment, the step of generating training requests respectively for each selected link includes requesting QoS profiles for each selected link through a control plane procedure. In addition, the step of measuring QoS performance on each selected link for the training requests includes detecting QoS profiles changes on the selected links.

In particular, the control plane procedure is a QoS negotiation.

In yet another embodiment, the step of generating training requests respectively for each selected link includes requesting alternative QoS profiles (AQP) for each selected link through a dynamic GBR QoS profile procedure. Moreover, the step of measuring QoS performance on each selected link for the training requests includes detecting QoS profiles changes on the selected links.

Furthermore, the method according to the present invention may also comprises a step of defining different channel conditions, and performing the steps as mentioned above for each channel condition.

In particular, the channel condition includes low, medium and high SNR scenarios and the QoS performance inter-dependency is obtained for each scenario.

Alternatively, the method according to the present invention may also include a step of measuring probability of acceptance for channel variation and combining the probability with the obtained the QoS performance inter-dependence.

Furthermore, the method according to the present invention is triggered by external event.

According to a second aspect of the invention, it is provided a data processing apparatus comprising means for carrying out the steps of abovementioned method.

According to a third aspect of the invention, it is provided a method for optimizing application performance with QoS performance inter-dependency, comprising:
  obtaining QoS performance inter-dependence according to the method mentioned first aspect of the invention;
  predicting performance of application for each QoS profile set of the obtained QoS performance inter-dependence;
  selecting a QoS profile set which renders the best performance for the application.

With such a method, it is possible to enhance the performance of the common application by means of the learnt and obtained QoS inter-dependence information.

Other features and advantages of the present invention will appear in the description hereinafter, in reference to the appended drawings.

DESCRIPTION OF EMBODIMENTS

Figure 1:
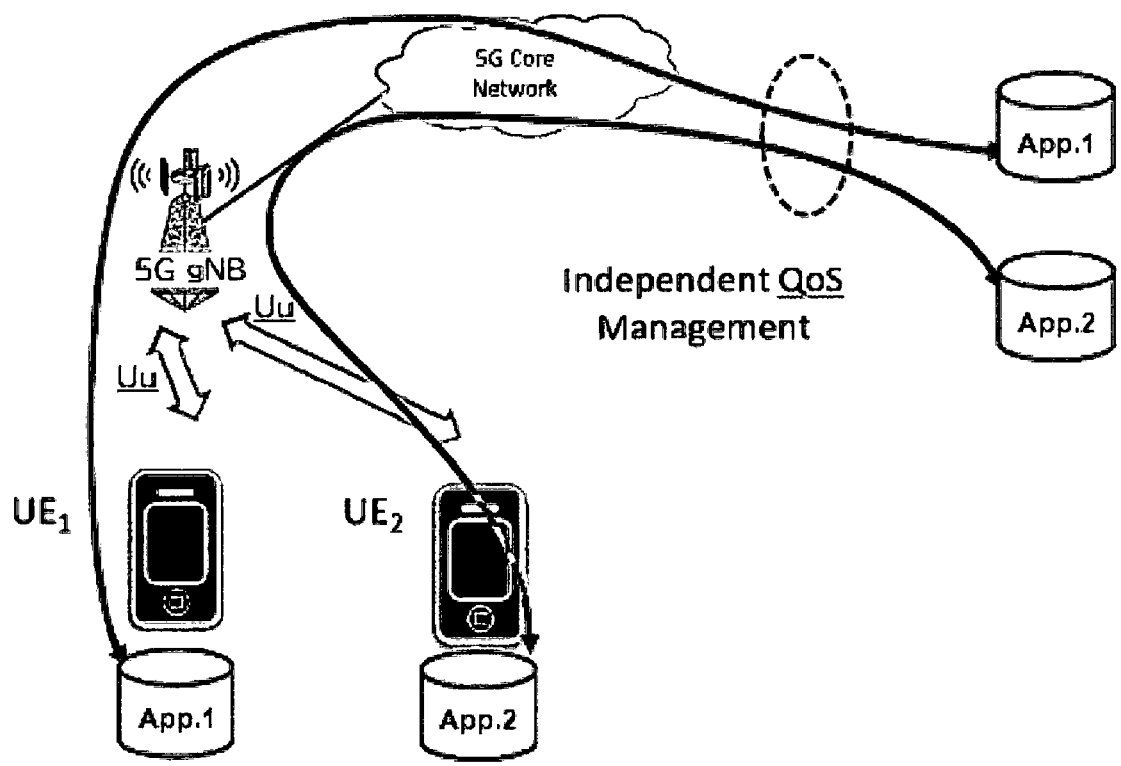
FIG. 1 illustrates independent QoS management for UEs with distinct applications in the art.
Figure 2:
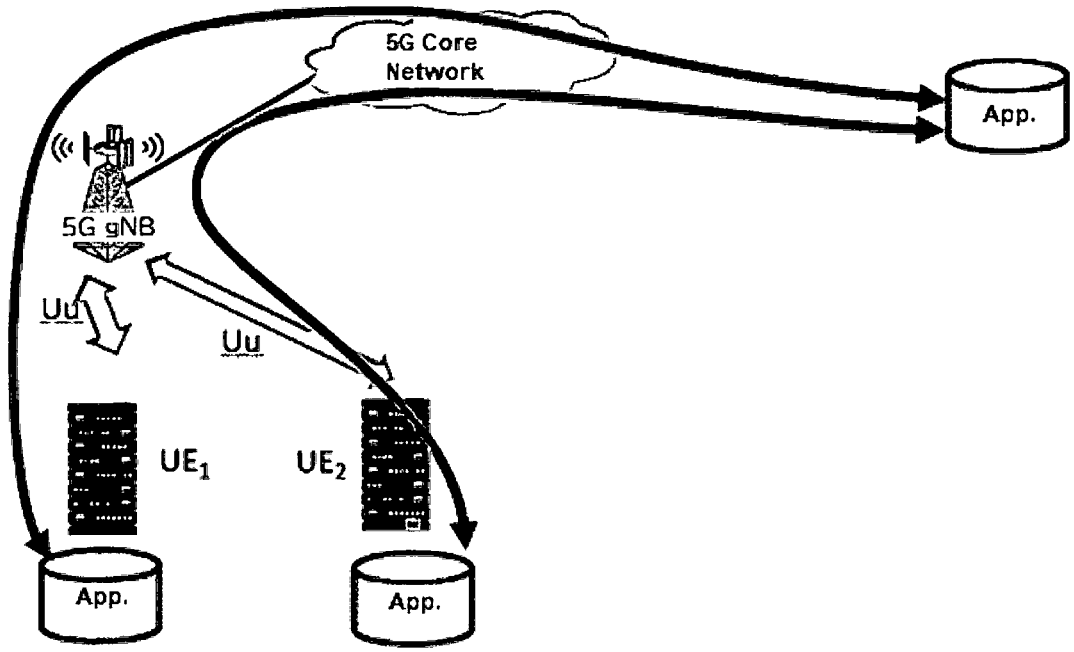
FIG. 2 illustrates dependent QoS management for UEs with the same applications according to the present invention.

FIG. 2 shows an exemplary setting of a network, such as a 5G network, in which the present invention is implemented, wherein users UE1 and UE2 use a common application App, such as a professional application of surveillance video communication for train or video streams application, and a center node, such as a 5G gNB, manages the different UEs' wireless links Uu which interface with the common application App applying a joint figure of merit via a 5G core network.

In particular, in the 5G network as shown in FIG. 2, at least two users UE1 and UE2 share a common resource, and the central node gNB establishes an individual, i.e. one to one, line with each of the users. From users' perspective, users UE1 and UE2 may be unknown to each other even when they are serving a common application or service. A user does not know the impact of his behavior and his traffic on other users' performance. It should be noted that the established links are interdependent, and they can respectively belong to different user or one single user.

The inventors have found that the deployment of an application layer common for several users makes it possible to learn the interdependence between the users' flows.

In order to learn the QoS performance inter-dependence of these wireless links, an exemplary method is now described by reference to FIG. 3.

Figure 3:
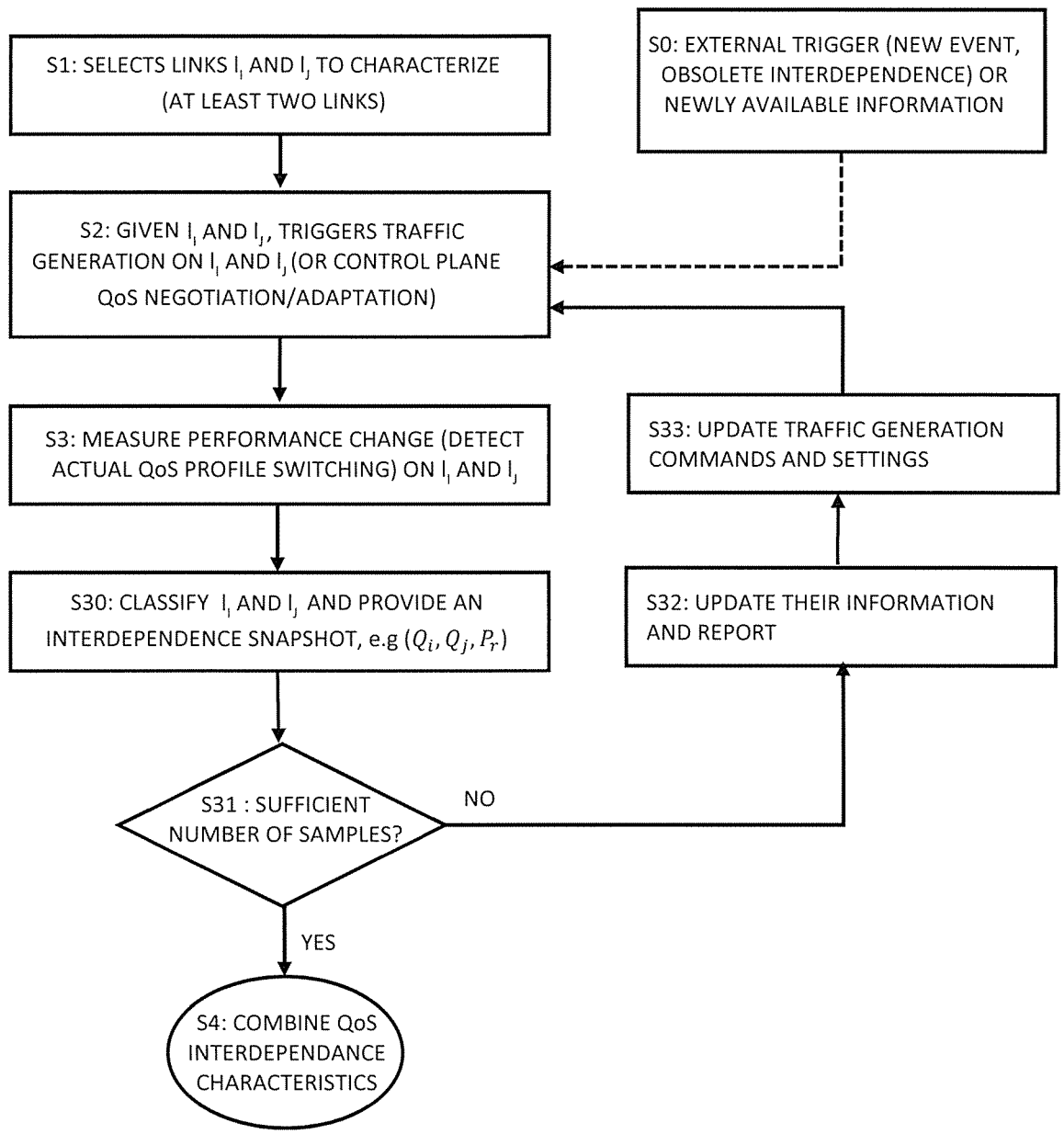
FIG. 3 is a flowchart of an illustrative method of learning QoS independence between different links according to the invention.

FIG. 3 is a flow chart showing the steps of the exemplary method for learning QoS performance inter-dependence between different links.

As an example, in a first step S1, two links $l_i$ and $l_j$ are selected to be characterized, wherein according to the present invention, the number of links is not limited to two.

Once the links are selected, in a next step S2, training requests are generated for each selected link $l_i$ and $l_j$. The training requests relate to user performance which depends on, for example, allocated resources, radio conditions and user position relative to the central node and also depends on other user traffic, radio conditions and allocated resources.

For instance, in step S2, for given links $l_i$ and $l_j$, the training request can be generated by triggering traffic generation on links $l_i$ and $l_j$ or control plane QoS negotiation/adaptation, which will be discussed in detail later.

Afterwards, QoS performance on each selected link, i.e. the performance change is measure in response to the training request, is measured in step S3, in particular, actual QoS profile switching is detected on each link $l_i$ or $l_j$.

Alternatively, when the QoS performance is measured, it is possible to classify the links $l_i$ and $l_j$ and provides an interdependence snapshot in step S30 and then judge if the number of samples are sufficient (S31). If the number is not sufficient, it is possible to update the information of the links and report the same in step S32, and the update traffic generation commands and settings, if any, so as to trigger new training request and measure the performance change, until the number of samples are sufficient. Skilled person, based on the different training requests, has no difficulty to understand and determine whether the number of samples is sufficient or not, as long as the number is sufficient to obtain the inter-dependence between the links.

Once the measurements are finished, in step S4, the measured QoS performance the selected links $l_i$ and $l_j$ are combined, such as by interlinking, so as to obtain the QoS performance inter-dependence between the selected links.

As mentioned, it is possible to generate training requests in different manners, which also means the performance inter-dependence between different links can be learned in different ways. For the purpose of examples, three different cases are now discussed.

Figure 4:
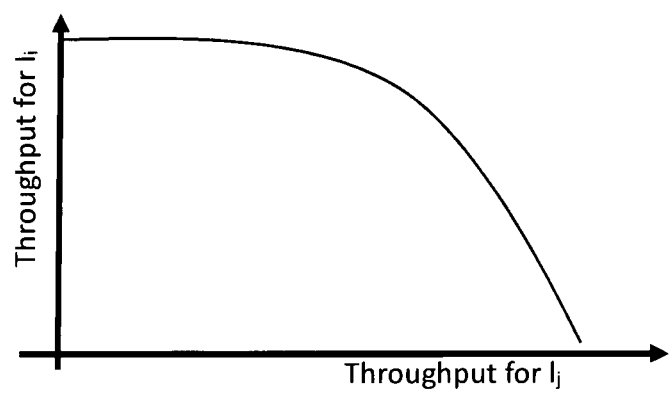
FIG. 4 shows throughput interdependency between links $l_i$ and $l_j$ for best effort traffic obtained by the method of learning QoS independence between different links according to the invention.

In a first case, learning link interdependence can be achieved by generating dummy traffic on link $l_i$ to the network using a set of different QoS parameters (e.g., priority level, PDB, PER, throughout) and measure performance change (enhancement or degradation) on $l_j$ and vice-versa. Link conditions (radio conditions, position, resources) are reported together with the generated traffic and the measured performance so that the latter can be the learning features. A detailed example of QoS inter-dependency for best effort traffic shown as the throughput interdependency between link $l_i$ and $l_j$ is illustrated in FIG. 4, wherein the throughout for links $l_i$ and $l_j$ for best effort traffic is inter-linked to obtain their inter-dependency.

Alternatively, it is also possible to generate real traffic pertaining to said common application on links $l_i$ and $l_j$ and to measure the performance change in response to the real traffic.

In this case, real or dummy data flows are transmitted through the data flow pipe opened and the radio access network (RAN) can measure the flow performance and feedback the QoS that can be established for this data flow to the application server.

In a second case, learning link interdependence can also be achieved taking QoS as a key metric. Mainly and through an existing system procedure, such as control plane procedures such as QoS negotiation, a QoS profile $Q_i$ is requested on $l_i$ and $Q_j$ is requested on $l_j$.

Figure 5:
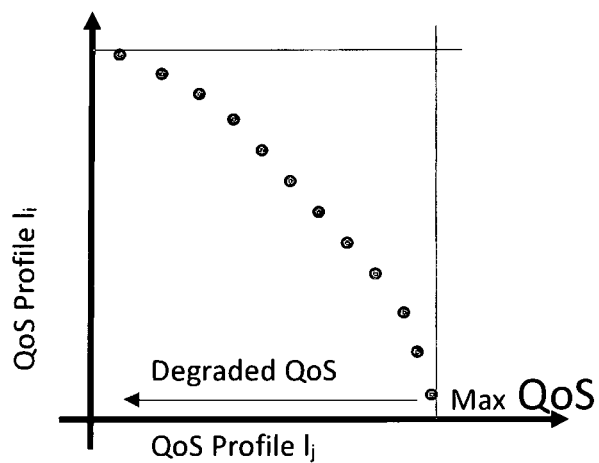
FIG. 5 shows QoS profile interdependency between links $l_i$ and $l_j$ for GBR traffic obtained by the method of learning QoS independence between different links according to the invention.

By iterating simultaneously on different levels of $Q_i$ and $Q_j$, the common application layer can establish the relationship between the two links in given conditions. The acceptance and rejection of each QoS profile request is acquired at the application server side via central node, such as gNB. There is no need to generate real traffic as QoS profiles are well known for both the network and the common application layer. An example of QoS inter-dependency for GBR traffic shown as the QoS profile interdependency between link $l_i$ and $l_j$ is illustrated in FIG. 5, wherein QoS profiles for links $l_i$ and $l_j$ for GBR traffic are interlinked.

Moreover, it shall be noted that during control plane procedure the application layer (either the application layer at the user node or the application server resides in the data network, depending on uplink or downlink traffic) will try to open a data flow with QoS parameters, the radio access network (RAN) will accept or reject the data flow according to RAN level information (such as the propagation channel condition of selected link ($l_i$, $l_j$), the current load of the system, etc). The control plane procedure refers to the procedure in control plane of application layer trying to open the data flow and how the RAN will response to the establishment of the data flow.

In a third case, learning link interdependence can also be achieved through Alternative QoS Profiles (AQP).

Figure 6:
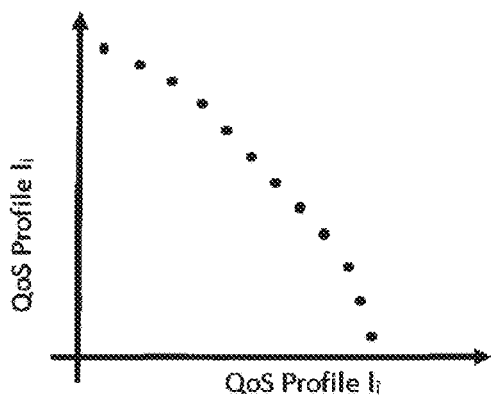
FIG. 6 shows QoS profile interdependency between link links $l_i$ and $l_j$ for GBR traffic with AQP obtained by the method of learning QoS independence between different links according to the invention.

For GBR QoS flows, application can ask user terminals to request target (preferred) QoS profiles and a list of fall back QoS parameters (e.g., PDB, PER, GFBR) on links $l_i$ and $l_j$ that the application is able to adapt to. Here it is the network (the base station) that determines which QoS profile is possible for each flow depending on traffic, radio conditions, base station load . . . , and the application (or the terminal) is warned about the current QoS profiles in use. Real or dummy traffic could be injected. Knowing the traffic injected and the current QoS profile reported for several users, the application server can learn the joint behaviour of the communication system. An example of QoS inter-dependency for GBR traffic with AQP shown as the QoS profile interdependency between link $l_i$ and $l_j$ is illustrated in FIG. 6.

In addition, for GBR QoS flow, regardless of whether it is based on QoS profile or AQP, the control plane procedure is pure signaling message (no data plane transmission): application layer will try to open the data flow by sending request(s) with QoS parameters which characterizes the flow, and the RAN will response with an acknowledgement.

Moreover, the case of traffic adaptation with GBR or latency constrained services through QoS request, the RAN will only acknowledge with a yes or not: the QoS flow is either accepted or rejected. For the case of traffic adaptation with GBR or latency constrained services through AQP, QoS request includes target (MAX) QoS profile and a list of fallback QoS modes, the RAN acknowledgement will inform the application server the QoS parameter that he is able to adapt.

Preferably, the above exemplary learning method may also take into account the different conditions and configurations in which the samples were obtained. Therefore, the obtained QoS performance inter-dependency between links can be conditioned on different configurations or can be presented as a multi-dimensional data base.

For example, due to the fact that the radio link conditions can vary due to channel fluctuation. In order to take into account such fluctuation, during the QoS inter-dependency learning procedure, it is possible to categorize the channel condition into low/medium/high SNR scenario and obtain the QoS inter-dependency for each scenario. Another possibility is to present the learned QoS inter-dependency as the QoS inter-dependence metric combined with a probability measure (e.g., $(Q_i, Q_j, P_r)$), such as the step S31, which takes into account the channel variation. In other words, when profile $Q_i$ is requested on link $l_i$, $Q_j$ is likely to be achievable on $l_j$ with a probability of $P_r$.

Therefore, the QoS interdependency relation learned can be presented as pair information presented in figure or n-tuples information stored in a database. This relation can be continuous or discrete, depending on the system configuration. It can also be conditioned on different configurations (e.g., SNR regime) or can be combined with other information (e.g., probability of acceptance) to reflect the fluctuation of the radio condition.

Preferably, learning link interdependence procedure can be triggered by external events such as obsolete interdependence (data staling) or a change in the neighbourhood, as illustrated in step S0 in FIG. 3.

Once the QoS performance inter-dependence information for different links has been learned by means of the above mentioned embodiments, such information, taking the previous two-link example, can be presented in the form of achievable QoS profile sets $(Q_i^1, Q_j^1), \ldots, (Q_i^N, Q_j^N)$, wherein the profile sets can be discretized sets or a continuous relation presented in curve, i.e., infinite pairs of QoS profile set. They can be used to enhance the performance of the application by means of the following two-step procedure:

1. For each achievable QoS profile set configuration $(Q_i^i, Q_j^i)$, predict the performance of the application based on the aforementioned QoS profile. Repeat the procedure for all the achievable QoS profile sets. In case of continuous QoS interdependency function over the links, derive the application performance as a function of the QoS interdependency function, in case of QoS profile presented together with a probability measure, an expectation optimization is performed for application performance evaluation.
2. Select the QoS profile set which renders the best performance for the application.

It should be noted that in step 1, performance prediction for the application is based on a predefined figure of merit for the application, which can be, for example, the throughput, delay, reliability etc., all depends on the application. Given a pair of QoS profile, it is known that further optimization on some other configuration parameters for the application regarding the predefined figure of merit can be performed.

Below are given two exemplary examples of utilizing the QoS inter-dependency information learning to optimize application performance.

A first embodiment is the traffic adaptation and QoS management through 5G MNO as a backhaul for railway communication system. In particular, the first embodiment relates to joint QoS management and routing optimization for surveillance video delay minimization for railway communication system through 5G MNO as a backhaul.

Figure 7:
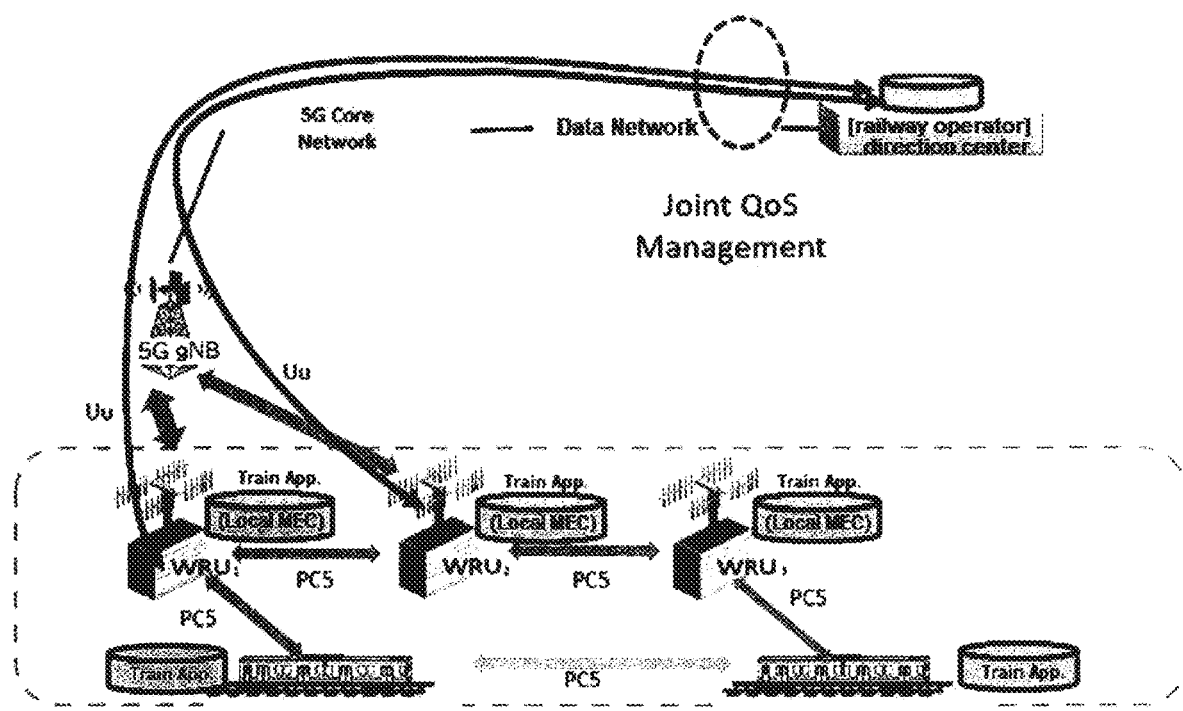
FIG. 7 illustrates a first exemplary embodiment of enhancing application performance with QoS performance inter-dependency.

As shown in FIG. 7, the users are the Wayside Radio Unit, such as $WRU_1$, $WRU_2$, and $WRU_3$ in a dedicated train radio network, as shown in the dashed rectangular in FIG. 7. A common application, Train App, is a railway operator related professional application which can be, for example, surveillance video communication for the train. The two Uu links between 5G gNB and $WRU_1$ and between 5G gNB and $WRU_2$ are inter-dependent, their QoS inter-dependency can be learned according to the one of the abovementioned exemplary methods for learning QoS performance inter-dependence.

One possible figure of merit for the train application can be delay minimization for the surveillance video. As is shown in FIG. 7, 5G MNO is used as backhaul for the professional train application. From the 5G MNO's point of view, the WRUs are conventional users served through the Uu interfaces. However, from the eyes of local 5G train network in the dashed rectangular in FIG. 7, WRUs serve as relaying or access points for the trains. Therefore, the flows that go through two Uu links can belong to the same train application, i.e. Train App., which make them inter-dependent with each other.

In this case, after the QoS inter-dependency learning, for each pair of achievable QoS profile, an optimization of the PC5 routing topology for the dedicated train radio network in dashed rectangular in FIG. 7 should be performed so as to minimize the delay for the surveillance video application.

After repeating the performance prediction over each achievable QoS profile, It is possible to select the optimal QoS profile pair and the associated best PC5 routing configuration which lead to the minimal delay performance.

A second embodiment is a QoE (quality of experience) management through MNO as a backhaul for video studio. In particular, it relates to joint QoS management and codec (/routing) optimization for QoE optimization for video studio through 5G MNO as a backhaul.

Figure 8:
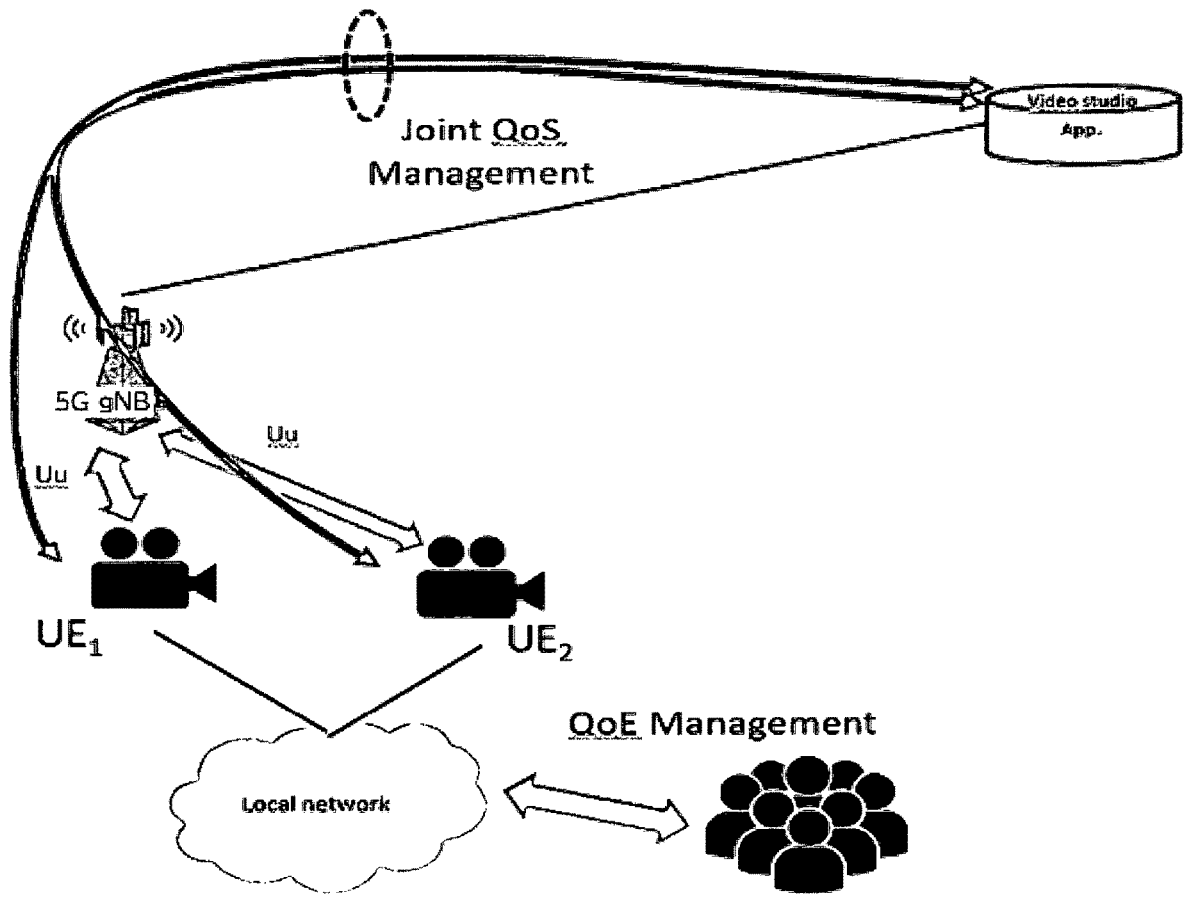
FIG. 8 illustrates a second exemplary embodiment of enhancing application performance with QoS performance inter-dependency.

FIG. 8 shows a network for providing video stream from a first camera $UE_1$ and a second camera $UE_2$ to end users who use or watch the video stream. $UE_1$ and $UE_2$ share a common video studio App. on a 5G network via 5G gNB. Therefore, two Uu links between MNO central node 5G gNB and $UE_1$ and between MNO central node 5G gNB and $UE_2$ are inter-dependent, and their QoS inter-dependency can be learned according to one of the abovementioned exemplary methods for learning QoS performance inter-dependence.

Typically, it is not necessary to request the highest quality for all video streams all the time: For example, the camera that is 'on air' would require a high video quality, although a lower quality could be acceptable for the video flows coming from the other cameras. Hence, the different video flow characteristics are linked at application level.

In this embodiment, one possible figure of merit for the video studio application can be QoE enhancement, e.g., Voice/image Quality etc. In this case, after the QoS inter-dependency learning, for each pair of achievable QoS profile, an optimization of the codecs for different users will be performed so that a target QoE metric can be achieved.

Alternatively, if a complicated local network is involved, path selection or local network routing topology optimization can also be jointly optimized for the QoE optimization. Such an optimization is known in the art.

With the abovementioned methods, the present invention proposes a method to learn the QoS inter-dependence for multiple communication links that interfaces with a common application to achieve a joint figure of merit, so as to obtain the interdependency relation between links. In addition, the present invention also proposes a method, based on the figure of merit for the application, for further enhancing the network performance by a joint optimization of the QoS of the links and some other configuration metrics, such as path selection.

Moreover, is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

The embodiments described hereinabove are illustrations of this invention. Various modifications can be made to them without leaving the scope of the invention which stems from the annexed claims.

The invention claimed is:

1. A method for optimizing application performance with QoS performance inter-dependency, comprising:
   learning QoS performance inter-dependence of a plurality of communication links in a network managed by a central node, wherein the central node establishes the plurality of communication links with a plurality of users in the network for sharing a common application, the learning comprising:
      selecting at least two links among the plurality of communication links;
      generating training requests respectively for each selected link;
      measuring QoS performance on each selected link for the training requests; and
      interlinking the measured QoS performance between the selected links, so as to obtain QoS performance sets for the selected links to learn the QoS performance inter-dependence between the selected links, the method further comprising:
   predicting performance of application for each set of the obtained QoS performance sets; and
   selecting a QoS performance set among the obtained QoS performance sets which renders the best performance for the application.

2. The method according to claim 1, wherein the generating training requests respectively for each selected link includes triggers traffic generation on selected links;
   wherein the measuring QoS performance on each selected link for the training requests includes measuring enhancement or degradation on the selected link.

3. The method according to claim 2, wherein the traffic is a real traffic pertaining to said common application or a dummy traffic generated according to the traffic characteristics of said common application.

4. The method according to claim 1, wherein the generating training requests respectively for each selected link includes requesting QoS profiles for each selected link through a control plane procedure;
   wherein the measuring QoS performance on each selected link for the training requests includes detecting QoS profiles changes on the selected links.

5. The method according to claim 1, wherein the communication links are wireless links.

6. The method according to claim 1, wherein the generating training requests respectively for each selected link includes requesting alternative QoS profiles for each selected link through a dynamic GBR QoS profile procedure;
   wherein the measuring QoS performance on each selected link for the training requests includes detecting QoS profiles changes on the selected links.

7. The method according to claim 1, further comprising defining different channel conditions, and the learning for each channel condition.

8. The method according to claim 7, wherein the channel condition includes low, medium and high SNR scenarios and the QoS performance inter-dependency is obtained for each scenario.

9. The method according to claim 1, wherein the method is triggered by an external event, the external event being obsolete interdependence or a change in neighborhood.

10. The method according to claim 1, wherein the obtained QoS performance inter-dependence contains a set of continuous or discrete QoS profile.

* * * * *